Patented Oct. 16, 1951

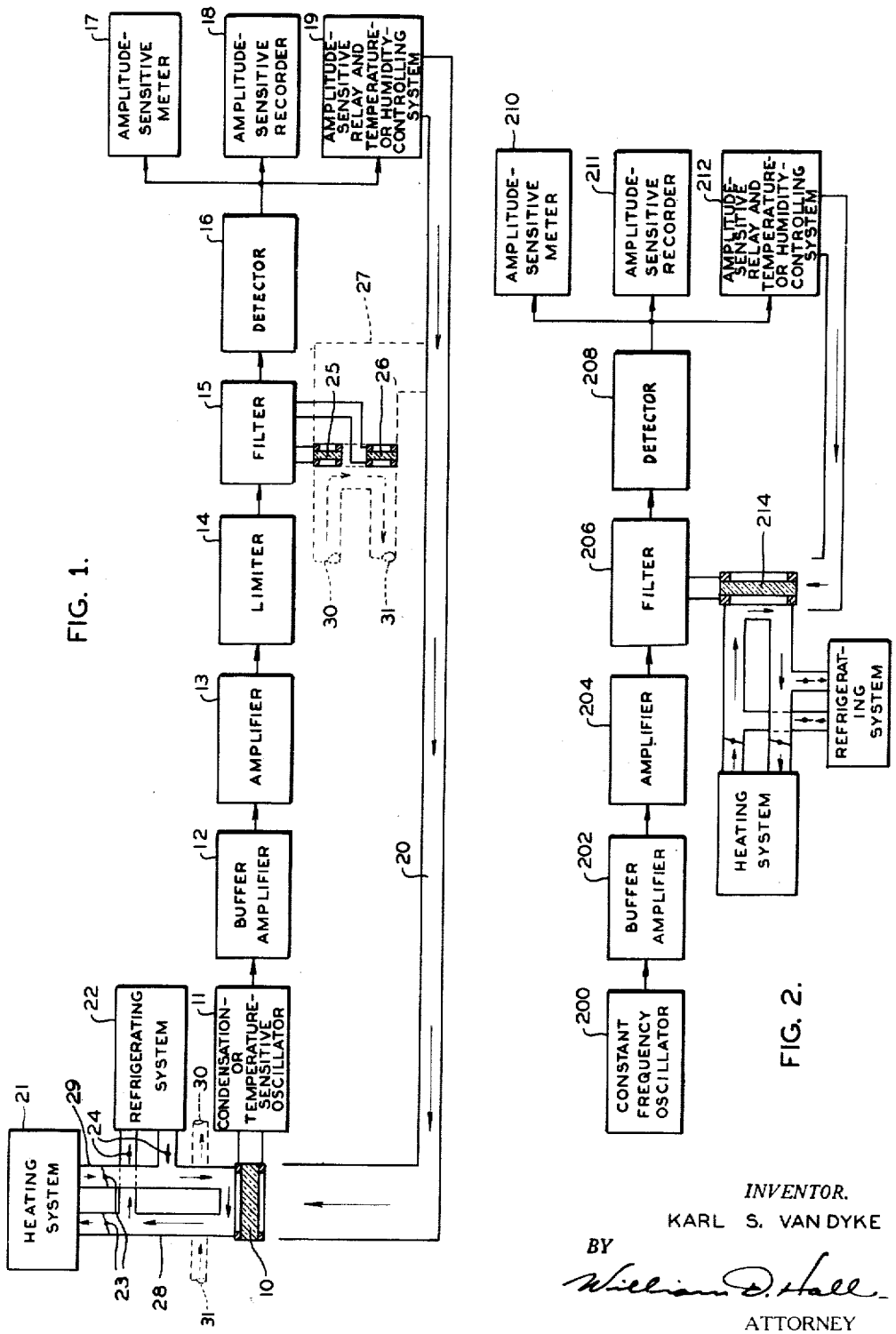

2,571,171

UNITED STATES PATENT OFFICE 2,571,171

DEW POINT HYGROMETER

Karl S. Van Dyke, Middletown, Conn., assignor to the United States of America as represented by the Secretary of War Application July 4, 1945, Serial No. 603,242

6 Claims. (Cl. 73—17)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to apparatus and methods for measuring quantities of vaporized substances in any gas, for controlling temperatures, measuring temperatures, and for detecting the presence of heat energy.

The invention will be described in connection with several specific embodiments which include, by way of illustration of the invention, a dew-point hygrometer, a temperature-measuring system, a temperature-controlling system, and a radiation-detecting system.

It is therefore an object of this invention to provide new methods and apparatus for measuring or indicating the presence of any condensable substance in vapor form, the apparatus thus acting, for example, as a dew-point hygrometer when used as an instrument for measuring atmospheric moisture.

Yet another object of this invention is to provide new methods and apparatus for measuring temperatures.

It is an additional object of this invention to provide new methods and apparatus for controlling temperatures.

Still another object of this invention is to provide new methods and apparatus for detecting the presence of heat energy, such as infra-red radiation, or, radiation which embraces portions of the visible and invisible light spectrum.

These and other features of the invention will be more clearly understood from the following detailed description and the accompanying drawings in which:

Figure 1 is a block diagram of an apparatus for measuring or indicating the presence of a condensable substance in vapor form, for indicating ambient temperature changes, or for detecting radiation, Figure 2 is a modification of an apparatus disclosed in Fig. 1.

The present invention discloses further modifications of the systems accomplishing the same results disclosed in my copending application on Dew Point Hygrometer, Serial Number 603,241, filed July 4, 1945, and issued January 2, 1951, as Patent No. 2,536,111, which is made a part of this disclosure.

In the above mentioned application systems are disclosed in which the device giving the final indications of the observed phenomenon are frequency-responsive devices.

In the present application the temperature, radiation, or condensate-sensitive devices are frequency-responsive devices, as in the case of the mentioned co-pending application, but they are connected to frequency-discriminating circuits arranged to produce amplitude changes in response to changes in temperature, radiation, or formation of condensate and the device giving the final indications of the observed phenomenon are amplitude responsive devices. Moreover, the system has been simplified by eliminating a reference frequency source. As in the case of my co-pending application, the invention utilizes a known phenomenon of quartz crystal oscillators which is that they are extremely sensitive to any loading of the exposed surface of the crystal. Such loading sensitivity, for example, extends to a monomolecular layer of water deposited on the surface of the crystal, the layer stopping the oscillation of the crystal-controlled oscillator circuit, or altering its frequency of oscillation, its activity, or its resonating properties, or all of these simultaneously. To obtain the formation of a deposit on the condensing surface of the crystal, the opposite surface of the crystal is subjected to, preferably, an alternating cycle of cooling and heating, the cooling cycle continuing until the dew-point is reached and until there is an incidence of condensate on the exposed condensing surface of the crystal. Upon the formation of the condensate, the cooling cycle is replaced by the heating cycle, and the latter is continued until the condensate present on the condensing surface is evaporated. The piezoelectric crystal is connected to a vacuum tube oscillator with the crystal controlling its frequency. As the condensing surface of the crystal becomes loaded during the cooling cycle, the frequency, or activity of the crystal, or both, change, producing a corresponding frequency change of oscillation or a diminution or cessation of the oscillations. These changes serve to indicate the incidence of condensation during the cooling cycle of the crystal. Corresponding indications, in reversed sense, may be obtained by reversing the process, i. e., with the crystal being heated until the last trace of a condensate, previously formed, disappears from the condensing surface during a warming process. By choice of the cut of quartz, the mode of vibration, and of the frequency of the condensation-indicating quartz element, the change in frequency with surface-loading may be made as sensitive as desired. Alternatively, by choice of the stability in the oscillator circuit, of which the condensation-indicating crystal is a part, the indications of deposit are made as critical as desired. During these alternate cooling and heating cycles the frequency of the oscillator is continuously measured and it is this frequency that is used for indicating the temperature of the condensing surface, the dew-point temperature being indicated by the frequency just prior to cessation of the oscillations from the previously established frequency-temperature calibration curve of the oscillator. Accurate determinations of the dew-point are possible by using a crystal-cut whose frequency varies rapidly with the temperature. The frequency, just prior to, or at the instant of appearance of condensation on the surface of the indicating crystal, and thus the dew-point temperature, is obtained by impressing this frequency on a frequency discriminating circuit and the amplitude of its output is varied in accordance with the frequency generated by the condensate-sensitive crystal. In my co-pending application, the frequency, just prior to, or at the instant of appearance of the condensate on the surface of the indicating crystal, and thus the dew-point temperature, is obtained by heterodyning means, which requires a reference frequency source. In the present invention, the heterodyning circuit has been replaced with the frequency-discriminating circuit and the reference-frequency source has been eliminated altogether.

Depending upon the type of mounting used for the crystal, and whether the crystal is subjected to alternate cooling and heating, it may be made especially sensitive to the formation of condensate, to temperature changes, or to the interception of radiant energy. Thus, when the temperature-sensitive crystal is placed at the focal point of a hyperbolic reflector, the temperature measuring system may be used as a radiation-detecting device. Also, when the temperature-sensitive crystal is subjected to alternate cooling and heating, and the cooling process is carried to the point at which there is a formation of a condensate on one of the surfaces of the crystal, the system becomes a condensate-sensitive system, and may be used, for example, as a dew-point hygrometer.

Referring to Fig. 1, a piezo-electric element 10 controls the frequency of a condensate- or temperature-sensitive oscillator 11 whose output is connected to a buffer amplifier 12, an amplifier 13, a limiter 14, and a filter 15, the output of the latter being impressed on an amplifier 16. The output of the amplifier is connected to an amplitude-sensitive meter 17, an amplitude-sensitive recorder 18, and an amplitude-sensitive relay and temperature- or humidity- or temperature-humidity-controlling system 19. The temperature- or humidity- temperature-humidity-controlling system is connected through a duct 20 to the ambient of crystal 10, and is used for controlling this ambient in terms of temperature, or humidity, or both, when the system is used for controlling the physical state of the ambient. When crystal 10 is used as a dew-point hygrometer, one side of the crystal, which is the upper side in Fig. 1, is subjected to alternate cooling and heating by means of heating and cooling systems 21 and 22 respectively. The alternate cooling and heating is accomplished by manipulating valves 23 and 24.

The functioning of the system disclosed in Fig. 1 is as follows:

The frequency of the condensate- and temperature-sensitive oscillator 11 is controlled by the temperature- and condensate-sensitive element 10, and the variable frequency output of oscillator 11, after proper amplification by amplifier 13 and limiting action of limiter 14, is impressed on band-pass filter 15, the parameters of the filter being adjusted so that the varying frequency output of oscillator 11 coincides with any desired cut-off portion of the frequency-attenuation curve of the filter. If the frequency of oscillator 11 coincides with the cut-off point of the filter, no signal is normally impressed on the amplitude-sensitive devices 17—19 when crystal 10 is subjected to the influence of humidity, or temperature, or radiation, or temperature-humidity conditions, corresponding to the normal ambient conditions.

When these ambient conditions change in terms of temperature, humidity, temperature-humidity, or radiation, there is a corresponding change in the natural period of vibration of crystal 10, or its activity, or its period and activity, with the concomitant change in the output of oscillator 11, this change being in the direction of the progressively decreasing attenuation introduced by filter 15. The filter thus acts as a frequency-discriminator. Formation of condensate on one of the surfaces or portions of the crystal is accompanied by the change in frequency during the cooling process and a sudden drop in activity leading to total cessation of oscillations upon the formation of a condensate. A change in temperature or radiation is accompanied only by a change in the frequency of oscillator. When the system is used as a dew-point hygrometer, a variable frequency signal is impressed by oscillator 11 on amplifier 12 during the cooling period of crystal 10. Upon the formation of the slightest traces of a condensate there may be a slight decrease in the activity of the crystal which is quickly followed by the total cessation of oscillations upon the formation of the monomolecular layer of the condensate on the surface of the crystal. When a variable-amplitude-variable-frequency signal is impressed on limiter 14, it eliminates the amplitude variation so that only variable-frequency signal is impressed on filter 15. The parameters of the filter are adjusted so that the frequency generated by oscillator 11 during normal ambient conditions coincides with the cut-off portion of the frequency-attenuation characteristic of the filter, so that there is no signal normally impressed on amplifier 16. As the frequency impressed on filter 15 decreases either a larger or smaller variable-amplitude-variable-frequency signal is impressed on amplifier 16, filter 15 thus acting as a frequency-discriminator. Amplifier 16 includes a detecting circuit or a rectifier with an integrating resistance-condenser combination, which convert the variable-frequency-variable-amplitude output of frequency-discriminator 15 into a variable-amplitude signal. Accordingly there is a variable-amplitude signal impressed on the amplitude-sensitive devices 17, 18, and 19, meter 17 indicating the degree of shift in the frequency of oscillator 11, recorder 18 recording this shift, and relay and temperature-humidity-controlling system 19 responding to this shift in such a manner as to restore the ambient conditions back to normal, should this be one of the sought results. It is obvious that the system may be used with any one of the illustrated amplitude-sensitive devices, separately or jointly, depending upon the desired results.

When Fig. 1 is used as a dew-point hygrometer or for detecting the presence of any other condensates, the use of limiter 14 is desirable for obtaining clear-cut indications on the amplitude-sensitive devices. When Fig. 1 is used for temperature or radiation measurements, limiter 14 may be eliminated altogether.

The scale of meter 17 and recorder 18 is calibrated directly in dew-point temperature or vapor pressure or both, and the reading immediately preceding the sudden drop in the reading at the instant of cessation of oscillations is the desired reading.

Filter 15 may be a fixed frequency-characteristic band-pass filter in which case the elements of the network are fixed. When this is the case, variations in amplitude are obtained solely because of the variation in the frequency generated by oscillator 11 and the range of the system depends upon the frequency range of that portion of filter 15 which corresponds to the cut-off region of the filter, i. e., the sharper is the cut-off, the narrower is the effective range of the frequency discriminators, but the more sensitive is the system.

When it is desirable to increase the sensitivity of the system disclosed in Fig. 1 still further, filter 15 may include piezo-electric elements 25, 26, etc., which increases the slope of the cut-off line, and thus makes the sensitivity of the system greater. Moreover, when filter 15 includes the piezo-electric elements, the crystal elements may be given temperature-frequency coefficients having an opposite sign to the temperature-frequency coefficient of crystal 10, and crystals 25, 26, etc., exposed to the same temperature variations as crystal 10 by means of an extension 27 of duct 20 and extensions 30 and 31 of ducts 28 and 29 used for heating and cooling crystal 10. The latter type of arrangement thus uses the differential temperature coefficient of frequency between the oscillator and the filter crystals, crystal 10 changing the frequency of oscillator 11 in one direction, while crystals 25 and 26 are changing the band-pass frequency of the filter in the opposite direction, with the resultant increase in the sensitivity of the system. This increased sensitivity is obtained at the expense of the temperature range of the system. The choice of the band-pass characteristics or filter 15, and whether these characteristics should remain fixed or variable, depends upon whether enhanced sensitivity is more important than the range of the system.

Fig. 2 discloses a modification of the system disclosed in Fig. 1, the modification residing in that an oscillator 200 is now a constant frequency oscillator whose output is impressed on a buffer amplifier 202, amplifier 204, a filter 206, an amplifier 208, and amplitude-sensitive devices 210, 211, and 212. Filter 206 is provided with a condensate- or temperature-sensitive piezo-electric element 214 (filter 206 may have a plurality of crystals, which is ordinarily the case in the crystal-controlled filters), and it is this piezo-electric element 214, that responds to any variations in the ambient conditions, i. e., temperature, or humidity, or humidity-and-temperature, or, radiation changes. As in the case of Fig. 1, formation of condensate produces abrupt drop in the amplitude, and the reading immediately preceding this abrupt drop is the measure of the dew-point temperature; the amplitude-sensitive devices may be also calibrated to give the vapor-pressure readings. Comparison of Figs. 1 and 2, reveals that in Fig. 2 the band-pass filter 206 is made to vary in accordance with ambient temperature, or humidity, and oscillator 200 now is a constant-frequency oscillator. As in the case of Fig. 1, the frequency of oscillator 200 is adjusted to coincide with the cut-off portion of 206 and the temperature coefficient of crystal 214 is selected so as to decrease the attenuation introduced by filter 206 when the ambient conditions of crystal 214 change.

In describing the invention, it has been stated that the frequency of oscillation is made to vary so that the degree of attenuation introduced by the filter decreases with the anticipated variation in the ambient conditions of crystal. It is obvious that the same end result may be obtained when the normal frequency coincides with the knee of the attenuation curve of the filter so that there is a maximum signal impressed on the amplitude-sensitive device under normal conditions and this signal is decreased with the anticipated change in the ambient. When the change in the ambient is in both directions, the frequency of the oscillator and the band-pass frequency characteristic of the filter must be adjusted so that under normal conditions the frequency coincides with the mid-point on the cut-off portion of the filter and the ambient changes in one sense decrease the amplitude of the output signal while the opposite ambient changes increase the amplitude.

While the invention has been disclosed in connection with the frequency-discriminators of the filter type, it should be apparent to those skilled in the art that other discriminator circuits may be used for accomplishing the same results. Thus, there are now in use in the frequency modulation systems, frequency-discriminating circuits using vacuum tubes in connection with broadly tuned circuits. When the broadly tuned circuits are replaced with the sharply tuned circuits then the frequency-discriminating circuits of the frequency modulation type may replace the band-pass filters illustrated in Fig. 1.

In Figs. 1 and 2, the heating and refrigerating systems are disclosed in a block form. It is to be understood that any suitable heating and refrigerating systems may be used for accomplishing the sought result. For a more detailed description of some of the specific heating systems, reference is made to my previously identified co-pending application.

While the invention has been described with reference to several embodiments, it will be understood that various modifications of the apparatus shown may be made within the scope of the following claims.

I claim:

1. A resonance-controlled apparatus including a variable frequency oscillator, a resonance controlling piezoelectric element connected to said oscillator for controlling the frequency thereof, the resonance characteristics of said piezoelectric element being responsive to changes in ambient temperature, whereby the frequency of said oscillator follows the ambient temperature, and a frequency-discriminating circuit connected to said oscillator for converting the frequency changes of said oscillator into amplitude changes, said amplitude changes corresponding to the changes in said ambient temperature, a band-pass filter, piezo-electric elements within said filter for controlling the band-pass frequency characteristic of said filter, a heating and refrigerating system connected to said piezo-electric element and to said filter for alternately cooling and heating all of said piezo-electric elements, the temperature-frequency coefficient of the piezo-electric element connected to said oscillator having an opposite sign than the temperature-frequency coefficient of the piezo-electric elements within said filter, whereby alternate heating and cooling of said piezo-electric element produces a frequency change within said oscillator opposite to the change in the band-pass frequency characteristic of said filter due to said alternating heating and cooling of said filter.

2. A dew-point hygrometer including, a constant frequency source, a band-pass filter connected to said source, a piezo-electric element within said filter, said piezo-electric element being sensitive to the formation of a condensate on said element, a heating and refrigerating system connected to one portion of said piezo-electric element for alternately heating and cooling said element, a detector connected to said filter for converting the output of said filter into a variable amplitude signal, and amplitude-sensitive devices connected to said detector for indicating the formation of condensate on said element.

3. A dew-point hygrometer as defined in claim 2 which further includes, a temperature- and humidity-controlling system connected to said amplitude-sensitive devices, and a connection between said system and the ambient of said crystal, said system being controlled by said devices so as to maintain the ambient of said piezo-electric element substantially constant.

4. An apparatus for measuring and indicating the presence of any condensable substance in vapor form which includes, a condensation-sensitive band-pass filter, a piezo-electric element controlling the band-pass frequency characteristic of said filter, instrumentalities for cooling and heating said piezo-electric element on one side, the other side of said piezo-electric element being exposed to said vapor, an alternating potential source connected to said filter, and instrumentalities connected to said filter for indicating the formation of said condensate on said element.

5. A resonance-controlled apparatus for indicating the formation of a condensate in an atmosphere containing a condensable substance in vapor form, including an oscillator, a band pass filter connected to said oscillator, at least one piezoelectric crystal within said filter, having at least one surface of said crystal exposed to said atmosphere, said crystal being frequency sensitive to the temperature of said atmosphere so as to effect a change in the attenuation characteristics of said filter corresponding to changes of temperature of said crystal, whereby said filter acts as a frequency discriminator for the signal impressed thereon by said oscillator, the amount of said frequency attenuation being a function of temperature, the attenuation characteristics of said filter being subject to abrupt change by the formation of a condensate on said exposed surface of said crystal, a detector connected to said filter, said detector converting the signals impressed upon it by said filter into a variable amplitude signal, and an amplitude responsive device connected to said detector whereby said device indicates the temperature at which a condensate forms on said exposed surface of the crystal.

6. A resonance controlled apparatus for indicating the formation of a condensate in an atmosphere containing a condensable substance in vapor form including a variable frequency oscillator for producing a signal, a piezoelectric crystal connected to said oscillator for controlling the frequency thereof, said crystal having one surface exposed to said atmosphere and one unexposed surface, said crystal being frequency sensitive to changes in temperature of said atmosphere, said crystal being adapted to have its characteristics changed abruptly by the formation of a condensate on said exposed surface, a frequency discriminator coupled to said oscillator, said frequency discriminator including a band pass filter, a second piezoelectric crystal within said filter, said second crystal having two opposed surfaces, one of said opposed surfaces being exposed and the other unexposed, said last-mentioned exposed surface being subject to the formation of condensate thereon, said second crystal being frequency sensitive to temperature, whereby a change in the cut-off frequency of said filter is produced by a change in the temperature, said second crystal having a temperature frequency coefficient such that the change in the cut-off frequency of said filter is in the opposite sense to the change in the signal frequency of said oscillator, a heating element and a refrigerating element, ducts connecting said heating element and said refrigerating element with said unexposed surface of said crystal and said unexposed surface of said second crystal, said heating element and said refrigerating element having valves, whereby said crystal may be cooled to form a condensate on the exposed surface of said crystal to cause said oscillator to stop oscillating, thereby indicating the dew point, and heated to a temperature at which the condensate formed by said cooling is eliminated by evaporation from said exposed surface, and an amplitude sensitive device connected to said frequency discriminator for indicating the temperature at said exposed surface and the presence of said condensate.

KARL S. VAN DYKE.

REFERENCES CITED

The following references are of record in the file of this patent:

UNITED STATES PATENTS

| Number | Name | Date |
| --- | --- | --- |
| 1,951,276 | Edwards et al. | Mar. 13, 1934 |
| 2,011,710 | Davis | Aug. 20, 1935 |
| 2,017,859 | Halstead | Oct. 22, 1935 |
| 2,230,649 | Mason | Feb. 4, 1941 |
| 2,361,634 | Koch | Oct. 31, 1944 |
| 2,375,273 | Black | May 8, 1945 |
| 2,412,782 | Palmer | Dec. 17, 1946 |

Certificate of Correction

Patent No. 2,571,171                                              October 16, 1951

KARL S. VAN DYKE

It is hereby certified that the above numbered patent was erroneously issued to the "United States of America as represented by the Secretary of War," as assignee of the entire interest therein, whereas said patent should have been issued to the inventor, Karl S. Van Dyke;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*